United States Patent [19]

Dorsch et al.

[11] Patent Number: 4,760,132
[45] Date of Patent: Jul. 26, 1988

[54] PROCESS FOR PREPARING CATIONIC HYDRAZONE DYESTUFFS

[75] Inventors: Hans-Lothar Dorsch, Cologne; Dietmar Kalz, Neunkirchen; Volker Hühne; Roderich Raue, both of Leverkusen, all of Fed. Rep. of Germany

[73] Assignee: Bayer Aktiengesellschaft, Leverkusen, Fed. Rep. of Germany

[21] Appl. No.: 942,467

[22] Filed: Dec. 16, 1986

[30] Foreign Application Priority Data

Dec. 21, 1985 [DE] Fed. Rep. of Germany ....... 3545605

[51] Int. Cl.$^4$ .................... C09B 57/00; C09B 43/00; C09B 46/00; D06P 3/76
[52] U.S. Cl. .................................. 534/574; 534/589; 548/505
[58] Field of Search .................. 534/574, 589; 548/505

[56] References Cited

U.S. PATENT DOCUMENTS

| | | | |
|---|---|---|---|
| 3,345,355 | 10/1967 | Raue | 534/57 X |
| 3,718,642 | 2/1973 | Lehment et al. | 534/574 |
| 3,840,518 | 10/1974 | Schmitt et al. | 534/574 |
| 3,973,903 | 8/1976 | Clarke | 534/589 X |
| 4,092,104 | 5/1978 | Clarke | 534/589 X |
| 4,168,264 | 9/1979 | Koller et al. | 534/574 |
| 4,248,775 | 2/1981 | Raue | 534/574 |
| 4,342,867 | 8/1982 | Gleinig et al. | 534/574 |
| 4,344,879 | 8/1982 | Mohr et al. | 534/589 X |
| 4,372,886 | 2/1983 | Zink et al. | 534/589 X |
| 4,376,728 | 3/1983 | Raue et al. | 534/574 |

*Primary Examiner*—Floyd D. Higel
*Attorney, Agent, or Firm*—Sprung Horn Kramer & Woods

[57] ABSTRACT

Cationic hydrazone dyestuffs of the general formula

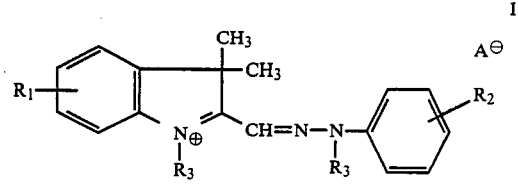

I in which
$R_1$ stands for hydrogen, $C_1$-$C_4$-alkyl, $C_1$- to $C_4$-alkoxy, nitro or halogen,
$R_2$ stands for hydrogen, $C_1$- to $C_4$-alkyl, $C_1$- to $C_4$-alkoxy, halogen or phenylazo,
$R_3$ stands for $C_1$- to $C_3$-alkyl and
$A^-$ stands for an anion, are prepared by quaternarizing azo bases of the general formula

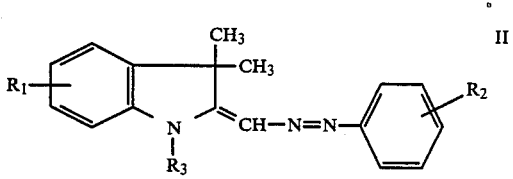

II wherein
$R_1$, $R_2$ and $R_3$ have the abovementioned meaning, with dialkyl sulphates of the general formula

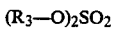

III in which
$R_3$ has the abovementioned meaning,
in the presence of water and alkali metal sulphate or alkaline earth metal sulphate and, where appropriate, by replacing the alkylsulphate anion by another anion.

12 Claims, No Drawings

PROCESS FOR PREPARING CATIONIC HYDRAZONE DYESTUFFS

The present invention relates to a process for preparing cationic hydrazone dyestuffs of the general formula

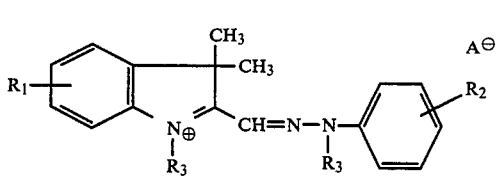

in which
- $R_1$ stands for hydrogen, $C_1$-$C_4$-alkyl, $C_1$- to $C_4$-alkoxy, nitro or halogen,
- $R_2$ stands for hydrogen, $C_1$- to $C_4$-alkyl, $C_1$- to $C_4$-alkoxy, halogen or phenylazo,
- $R_3$ stands for $C_1$- to $C_3$-alkyl and
- $A^-$ stands for an anion, by quaternarizing azo bases of the general formula

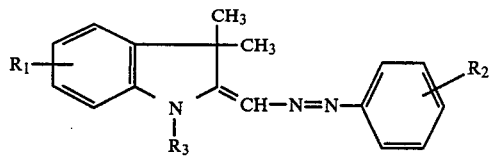

in which
$R_1$, $R_2$ and $R_3$ have the abovementioned meaning, with dialkyl sulphates of the general formula $$(R_3-O)_2SO_2 \quad III$$

in which
$R_3$ has the abovementioned meaning,
in the presence of water and alkali metal sulphate or alkaline earth metal sulphate and, where appropriate, by replacing the alkylsulphate anion by another anion.

The process is carried out as a rule within a pH range from 6 to 10 using acid-binding agents such as sodium carbonate, magnesium oxide or sodium hydroxide solution at temperatures between 20° and 70° C. and requires reaction times of about 30 minutes to about 4 hours.

Preferred alkali metal sulphate is sodium sulphate and preferred alkaline earth metal sulphate is magnesium sulphate. Particular preference is given to sodium sulphate.

The preferred weight ratio of azo base II: water is 1:1-10, that of azo base II: Na sulphate or Mg sulphate is 1:0.5-4, and the preferred molar ratio of azo base: dialkyl sulphate is 1:1.5-5.

The process can be carried out for example by presenting the suspension comprising aqueous sodium sulphate solution, azo base II and acid-binding base at room temperature and adding the dialkyl sulphate as quickly as possible, the subsequently starting slightly exothermic reaction being kept below 70° C. by cooling. The suspension turns initially into a mobile, two-phase mixture of dye resin I in the salt solution, which, as alkylation proceeds, in turn solidifies and partially crystallizes.

Before further processing to give the commercial product, the reaction mixture, to destroy excess dialkyl sulphate, can be acidified and subsequently stirred at elevated temperature, for example 60° to 90° C.

Since the process leads to dye salts I of high purity and thus the removal of by-products is not required, the reaction mixture obtained can for example be evaporated to dryness in a paddle dryer. The sulphate added according to the invention then remains as a standardizing agent in the dyestuff product. This procedure has the advantage that no waste water is produced in the preparation of the dyestuff. However, the reaction mixture can also be worked up by separating the precipitating dye salt I from the salt-containing aqueous layer. The practically saltfree dyestuff resin with the n-alkylsulphate anion crystallizes on cooling down and, after addition of standardizing agents, provides commercial dyestuff. The product is particularly highly suitable for preparing commercial dyestuff solutions.

The quaternarization according to the invention can advantageously be carried out in the presence of solubilizers for azo base and dialkyl sulphate. Their preferred concentration is up to 15% by weight, relative to azo base. Suitable solubilizers are in particular waterinsoluble or sparingly water-soluble organic compounds such as (chloro)hydrocarbons, for example benzene, toluene, xylene or chlorobenzene, alcohols, ethers or esters, for example lauryl alcohol, anisole, phenoxyethanol, alkyl esters of acetic acid, benzoic acid, phthalic acid or toluenesulphonic acid, and in particular neutral emulsifiers such as reaction products of 2 to 60 moles of ethylene oxide or propylene oxide with $C_6$-$C_{22}$-alkanols, -alkylamines or -alkylcarboxylic acids, for example reaction product of lauryl alcohol with 2 to 10 ethylene oxide, reaction product of oleic acid with 4 to 8 ethylene oxide, reaction product of oleyl alcohol with 30 to 60 ethylene oxide or reaction product of castor oil with 20 to 40 ethylene oxide.

In a preferred embodiment of the process according to the invention, the preparation of bases II by diazotizing amines

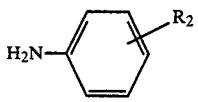

and coupling with compounds

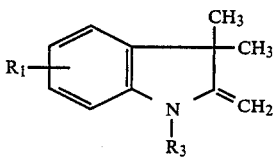

and the quaternarization to give dyestuffs I is carried out in a single-vessel process. Therein the diazotization is advantageously effected in aqueous sulphuric acid in place of the otherwise customary hydrochloric acid. The advantage is that on adding sodium hydroxide solution, which is added to obtain the pH value of 2 to 5 which is favourable for the coupling, already some of the Na sulphate required for quaternarization is formed, and that in addition no chloride ions which could form by-products in the course of the quaternarization are present.

In the formulae, halogen is preferably understood as meaning fluorine, chlorine or bromine. Also preferred are:

$R_1$ for hydrogen, methyl or methoxy, $R_2$ for hydrogen, methyl, ethyl, methoxy, ethoxy or phenylazo, $R_3$ for methyl or ethyl and $A^-$ for methosulphate, ethosulphate, chloride, bromide, sulphate, phosphate, formate or acetate or mixtures of these anions.

The process according to the invention is particularly suitable for preparing the dyestuffs of the formula I in which $R_1$ stands for hydrogen, $R_2$ stands for hydrogen, methoxy or methyl, $R_3$ stands for methyl and $A^-$ stands for the abovementioned anions.

The process according to the invention permits the almost quantitative conversion of bases II to dyestuffs I. The dyestuffs obtained have good fastness properties and dye in particular acid-modified fibres in bright brilliant hues.

Compared with known aqueous quaternarization processes, the advantage of the new process is that, for the same amount of dialkyl sulphate and the same reaction temperatures, an increase in the degree of conversion and a reduction in the reaction time is obtained.

EXAMPLE 1

55 g (=0.2 mol) of the azo compound of the formula

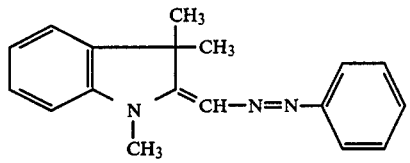

are suspended at room temperature in 350 g of aqueous 30% strength sodium sulphate solution. 4.6 g of magnesium oxide are added, followed in the course of 20 minutes of efficient stirring, starting at 30° C. to a maximum of 40° C., by the dropwise addition of 50 g (=0.4 mol) of dimethyl sulphate to the mixture. The mixture is subsequently stirred at 40° C. for 2 hours, during which the initial suspension turns with increasing degree of methylation into an emulsion of the dye resin. On switching off the stirrer the dye resin separates off as top phase, and in a thin layer chromatogram is found to contain only 0.01% left over from the above azo compound. The alkaline emulsion is acidified with about 5.5 g of 78% strength sulphuric acid to pH 5.0 and, to destroy the excess dimethyl sulphate, is subsequently stirred at 65° C. for 30 minutes. After clear-cut removal of the dye resin at 65° C. the cationic dyestuff of the formula

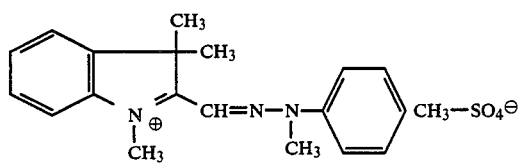

is present. The dyestuff crystallizes out on cooling down and, even without further purification, dyes acid-modified synthetic fibres in a greenish yellow shade of excellent fastness.

The warm dye oil is dissolved in 300 parts of 2.5% strength hydrochloric acid, and at 60° C. 45 parts of sodium chloride are added. Cooling down gives a crystalline suspension of the dyestuff chloride.

The dyestuff is obtained in comparable purity when, in place of the 350 g of 30% strength sodium sulphate solution mentioned, 350 g of a 25% strength, of a 20% strength, of a 15% strength or of a 10% strength sodium sulphate solution are used.

When in place of the 350 g of sodium sulphate solution of the abovementioned concentrations 350 parts of water are used, the dry dyestuff, however, still contains 12% of the abovementioned azo precursor.

When the methylation reaction described is carried out not in 350 parts of 30% strength sodium sulphate solution but in 350 parts of 30% strength potassium sulphate solution, 30% strength aluminium sulphate solution, 30% strength ammonium sulphate solution or in 30% strength solution of the sodium salt of methyl sulphate, the precursor contents in the dry dyestuff are at least 5 to 10 times higher.

EXAMPLE 2

58 g (=0.2 mol) of the azo compound

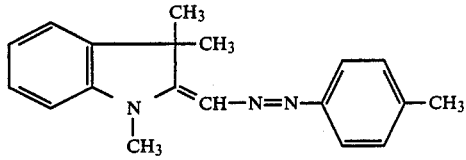

are suspended in 350 g of 20% strength aqueous sodium sulphate solution. After addition of 8.1 g of magnesium oxide, 93 g (0.7 mol) of dimethyl sulphate are metered with vigorous stirring at 30° C. to at most 42° into the mixture in the course of about 20 minutes. This is followed by 4 hours of stirring at 40° C., and removal from the mixture of a partially crystalline dye resin sample for a thin layer chromatogram. The dye resin is found to have a precursor content of less than 0.1%. The mixture is acidified with about 6 g of 78% strength sulphuric acid to pH 5, is heated to 65° C. and is subsequently stirred for 30 minutes. After switching off the stirrer the lower aqueous phase is separated off, and the warm dye resin is taken up in 300 g of 2.5% strength hydrochloric acid. To the reddish brown dyestuff methosulphate solution are added with vigorous stirring at 75° C. 25 g of sodium chloride, which is followed by gradual cooling down to room temperature, during which from about 50° C. onward the dyestuff of the formula

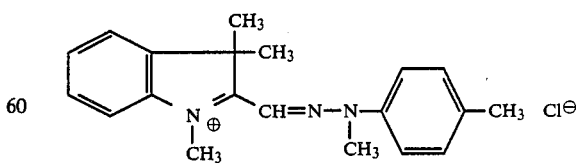

precipitates in crystalline form. Filtering off and washing with sodium chloride solution and drying gives 71 g of the dyestuff.

The dyestuff is obtained in the same purity when, in place of 350 g of 20% strength sodium sulphate solution, 350 g of a 30% strength or 10% strength sodium sulphate solution are used.

EXAMPLE 3

61 g (=0.2 mol) of the azo compound

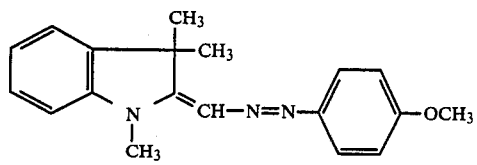

are suspended at room temperature in 350 g of 25% strength aqueous sodium sulphate solution. 8.6 g of magnesium oxide are added to the mixture, and the temperature is raised to 30° C. 101g (=0.8 mol) of dimethyl sulphate are metered in with vigorous stirring in the course of 10 to 20 minutes, during which the temperature is allowed to rise to 45° C. This is followed by stirring at 40° C. to 45° C. for 4 hours, during which the precursor suspension turns after about one hour into a dye oil which becomes partially crystalline towards the end of the methylation period. A thin layer chromatogram of the dye resin shows 0.2% of precursor. Acidification of the mixture with about 2 g of 78% strength sulphuric acid to pH 5 is followed by stirring at 65° C. for 30 minutes, and subsequently after switching off the stirrer, the upper dye resin is left for one hour at 75° C. to separate off. This dye resin is the pure dyestuff methosulphate of the formula

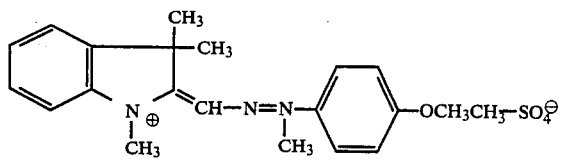

This dyestuff, after drying, can even without additonal purification operations be used for dyeing acid-modified synthetic fibres in a golden yellow shade.

The dyestuff methosulphate resin separated off is dissolved at 70° C. in 300 g of 2.5% strength hydrochloric acid, and 9 g of sodium chloride are added to the hot solution. The mixture is cooled down from 70° C. to room temperature with stirring in the course of 5 hours. Filtering and washing with dilute sodium chloride solution gives on drying 60 g of crystalline dyestuff chloride.

This dyestuff is likewise characterized by a high all-round fastness level on acid-modified synthetic fibers or fabrics, which are dyed in a golden yellow shade.

The identical dyestuff methosulphate chloride of the indicated formula is also obtained when, in place of the 350 g of 25% strength sodium sulphate solution, 350 g of a 30% strength suspension (unstable solution) or 350 g of a 15% strength or 10% strength sodium sulphate solution are used.

EXAMPLE 4

61 g (=0.2 mol) of the azo compound of Example 3 are suspended at room temperature in the solution of 350 g of 25% strength aqueous sodium sulphate solution.

To the mixture are added 8.6 g of magnesium dioxide and also 6.1 g (10% of the azo precursor) of one of the following substances:
benzene,
toluene,
o-, m-, p-xylene or mixtures,
ethylbenzene,
chlorobenzene,
anisole,
2-phenoxyethanol,
methyl or ethyl or n-butyl benzoate,
2-hydroxyethyl benzoate,
glycol mono- or di-benzoate,
dibutyl phthalate,
methyl or ethyl o- or p-toluenesulphonate,
ethyl acetate,
lauryl alcohol pure or technical-grade mixtures,
reaction product of lauryl alcohol with 2 to 10 ethylene oxide,
reaction product of oleic acid with 4 to 8 ethylene oxide, reaction product of oleyl alcohol with 30 to 60 ethylene oxide or reaction product of castor oil with 20 to 40 ethylene oxide.

The suspension is heated to 30° C., and in the course of 10 to 20 minutes 101 g (=0.8 mol) of dimethyl sulphate are added with thorough stirring. This is followed by stirring at 40° C. for a total of 4 hours, during which already after 2 hours a thin layer chromatogram of the dye resin shows a precursor content of about 0.2%, which corresponds to that of Example 3 after 4 hours. After 4 hours of subsequent stirring a sample of the dye resin shows a precursor content of only 0.1 to 0.05%.

Acidification of the reaction mixture with about 2 g of 78% strength sulphuric acid to pH 5 is followed by 30 minutes of stirring at 65° C., and after the stirrer has been switched off the mixture is left at 75° C. for one hour to separate off.

The dye oil is the dyestuff methosulphate shown as a formula in Example 3.

EXAMPLE 5

39.5 g of aniline are diazotized at −5° C. to 3° C. in dilute aqueous sulphuric acid by metered addition of 87 g of 34.4% strength sodium nitrite solution. The excess of nitrous acid is destroyed in the cold by gradual addition of about 5 g of 15% strength amidosulphonic acid solution. The cold diazonium salt solution is added to 69.3 g of 1,3,3-trimethyl-2-methyleneindoline and 15.3 g of acetic acid, and by metered addition of 152 g of 30% strength sodium hydroxide solution at 10° C. to 20° C. in the course of 5 hours the azo compound of Example 1 is prepared in the form of a yellow suspension.

To the mixture are added 42.3 g of sodium sulphate and 12.8 g of magnesium oxide, bringing the mixture to a pH of at least 10. 145.5 g of dimethyl sulphate are added at initially 25° C. with vigorous stirring in the course of about 20 minutes in such a way that 40° C. is not exceeded. This is followed by 4 hours of stirring at 35° C. to 40° C., and after cooling down to room temperature by removal of a thin layer chromatogram sample of the dye resin. The precursor content is below 0.15%. About 11 g of 78% strength sulphuric acid are added to bring the pH to 5. The temperature is then raised to 65° C. for 30 minutes to destroy the dimethyl sulphate. After the stirrer has been switched off the mixture is left to stand at 50° C. to 65° C. for one hour, and the lower aqueous phase is cleanly separated off while still hot.

The dye resin, which immediately becomes crystalline on cooling down, is the dyestuff methosulphate of Example 1.

This dyestuff can be used without purification operation for dyeing materials made of polyacrylnitrile or acid-modified polyamide or polyester.

EXAMPLE 6

96 g of the dry dyestuff methosulphate of Example 3 are dissolved at 40° C. in 104 g of 50% strength of aqueous acidic acid to give a clear solution. This dyestuff solution has a long storage life not only when cold but also at about 40° C. The golden yellow dyeings are distinguished on acidmodified synthetic fibres by a high fastness level. Using instead of the 104 g of 50% strength acetic acid mentioned 304 g of the solution of 208 g of 50% strength acetic acid in 96 g of ethylene glycol or 104 g of the solution of 20 g of 2-hydroxypropionitrile and 84 g of ethylene glycol likewise gives valuable, commercial dyestuff solutions.

We claim:

1. A process for preparing a cationic hydrazone dyestuff of the formula

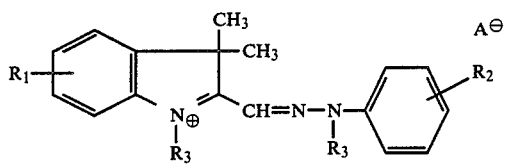

in which
R$_1$ stands for hydrogen, C$_1$-C$_4$-alkyl, C$_1$-to C$_4$-alkoxy, nitro or halogen,
R$_2$ stands for C$_1$- to C$_4$-alkyl,
C$_1$- to C$_4$-alkoxy, halogen or phenylazo,
R$_3$ stands for C$_1$- to C$_3$-alkyl and
A$^\ominus$ stands for an anion,
comprising quaternarizing an azo base of the formula

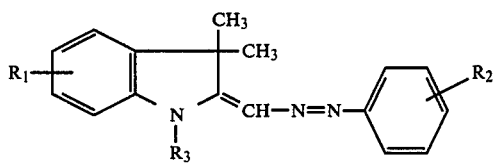

with a dialkyl sulphate of the formula

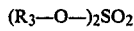

in a molar ratio of 1:1 to 5.5 of azo base to dialkyl sulphate in the presence of a solvent consisting essentially of water, wherein the water is in a weight ratio of azo base: water of 1:1–10 and, where appropriate, by replacing the alkylsulphate anion by another anion, characterized in that the quaternarization is carried out in the presence of an alkali metal sulphate or an alkaline earth metal sulphate by adding the dialkyl sulphate to an aqueous suspension comprising said alkali metal sulphate or alkaline earth metal sulphate, azo base and an acid binding agent and maintaining a temperature of below 70° C.

2. A process according to claim 1, wherein the weight ratio of azo base: sulphate is 1:0.5–4.

3. A process for preparing a cationic hydrazone dyestuff of the formula of claim 1 in which
R$_1$ stands for hydrogen, ethyl or methoxy,
R$_2$ stands for methyl, ethyl, methoxy ethoxy or phenylazo,
R$_3$ stands for methyl or ethyl and
A$^\ominus$ stands for methosulphate, ethosulphate, chloride, sulphate, phosphate or acetate or mixtures of these anions.

4. A process according to claim 1 which further comprises carrying out the quaternarization in the presence of a solubilizer.

5. A process according to claim 1, wherein the neutral emulsifier is a reaction product of 2-60 moles of ethylene oxide or propylene oxide on alkyl alcohols having 6-22 C atoms.

6. A process according to claim 1 wherein the quaternarization is carried in a single-vessel process, subsequently to the preparation of the azo base by diazotizing an amine of the formula

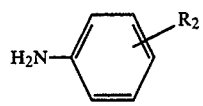

and coupling with a compound of the formula

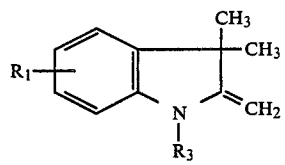

in a sulphuric acid solution.

7. A process according to claim 1, wherein the alkali metal sulphate is sodium sulphate.

8. A process according to claim 1, wherein the alkaline earth metal sulphate is magnesium sulphate.

9. A process according to claim 1, wherein the acid binding agent is selected from the group consisting of sodium carbonate, magnesium oxide and sodium hydroxide.

10. A process according to claim 1, wherein the quaternarizing is conducted at a pH of 6 to 10.

11. A process according to claim 4, wherein the solubilizer is selected from the group consisting of benzene, toluene, xylene, chlorobenzene, alcohols, ethers, esters and neutral emulsifiers.

12. A process according to claim 1, wherein the halogen is selected from the group consisting of fluorine, chlorine and bromine.

* * * * *

UNITED STATES PATENT AND TRADEMARK OFFICE
CERTIFICATE OF CORRECTION

PATENT NO. : 4,760,132
DATED : July 26, 1988
INVENTOR(S) : Hans-Lothar Dorsch, et al It is certified that error appears in the above-identified patent and that said Letters Patent is hereby corrected as shown below:

Col. 8, line 18     Delete "claim 1" and substitute
 (Claim 5)          --claim 12--

Signed and Sealed this

Twenty-first Day of March, 1989

Attest:

DONALD J. QUIGG

Attesting Officer

Commissioner of Patents and Trademarks